US008797720B2

(12) United States Patent
Weiher et al.

(10) Patent No.: US 8,797,720 B2
(45) Date of Patent: Aug. 5, 2014

(54) MANUALLY-CONTROLLED ARC FLASH ENERGY REDUCTION SYSTEM AND METHOD FOR CIRCUIT BREAKER TRIP UNITS

(75) Inventors: Helmut Weiher, Auburn Township, OH (US); Sean McGuinness, Mentor, OH (US)

(73) Assignees: Utility Relay Company, Chagrin Falls, OH (US); Kirk Key Interlock Company LLC, Massillon, OH (US)

( * ) Notice: Subject to any disclaimer, the term of this patent is extended or adjusted under 35 U.S.C. 154(b) by 196 days.

(21) Appl. No.: 13/611,459

(22) Filed: Sep. 12, 2012

(65) Prior Publication Data

US 2013/0063871 A1 Mar. 14, 2013

Related U.S. Application Data

(60) Provisional application No. 61/533,843, filed on Sep. 13, 2011.

(51) Int. Cl.
| | |
|---|---|
| *H02B 1/32* | (2006.01) |
| *H02H 3/08* | (2006.01) |
| *H02H 9/00* | (2006.01) |
| *H02H 3/00* | (2006.01) |
| *H02H 9/08* | (2006.01) |

(52) U.S. Cl.
CPC . *H02H 3/08* (2013.01); *H02H 3/00* (2013.01); *H02H 9/08* (2013.01); *H02H 9/00* (2013.01); *H02H 3/006* (2013.01)
USPC ........ 361/643; 361/2; 361/5; 361/42; 361/95; 361/96; 361/115; 361/601; 361/615

(58) Field of Classification Search
CPC .................................. H02B 1/32; G06F 17/10
USPC ......... 361/2, 5, 42–50, 62, 63, 93.2, 93.7, 95, 361/96, 102, 115, 93.1, 601, 615, 622, 634, 361/643, 653
See application file for complete search history.

(56) References Cited

U.S. PATENT DOCUMENTS

| | | | |
|---|---|---|---|
| 4,266,259 A | 5/1981 | Howell | |
| 4,468,714 A | 8/1984 | Russell | |

(Continued)

FOREIGN PATENT DOCUMENTS

WO 93/12566 A1 6/1993

OTHER PUBLICATIONS

Eaton Corporation, "Arcflash Reduction Maintenance Switch", May 2005, Moon Township, PA, USA.

(Continued)

*Primary Examiner* — Michail V Datskovskiy
(74) *Attorney, Agent, or Firm* — Pearne & Gordon LLP

(57) ABSTRACT

A circuit protection system has a normal mode, and a maintenance mode with reduced potential arc flash energy. A downstream circuit breaker is mounted within a first enclosure comprising a first access panel. A locking mechanism locks the first access panel closed. An upstream breaker is mounted within a second enclosure comprising a second access panel. A current sensor senses current and is in communication with an electronic trip unit that controls current interruptions by the upstream breaker based on a trip setting. A user interface device is accessible when second enclosure is closed, and allows user selections of normal and maintenance modes. When maintenance mode is selected, the trip unit changes the trip setting such that potential arc flash energy is reduced. The system is configured to keep the first access panel locked closed based on normal mode being selected, and allow unlocking based on maintenance mode being selected.

28 Claims, 5 Drawing Sheets

(56) References Cited

U.S. PATENT DOCUMENTS

| | | | |
|---|---|---|---|
| 4,866,557 A | 9/1989 | Fitts et al. | |
| 4,996,646 A | 2/1991 | Farrington | |
| 5,113,043 A | 5/1992 | Morris | |
| 6,175,479 B1 | 1/2001 | Boyd et al. | |
| 6,212,049 B1 | 4/2001 | Spencer et al. | |
| 6,252,365 B1 | 6/2001 | Morris et al. | |
| 6,297,939 B1 | 10/2001 | Bilac et al. | |
| 6,313,975 B1 | 11/2001 | Dunne et al. | |
| 6,347,027 B1 * | 2/2002 | Nelson et al. | 361/64 |
| 6,356,422 B1 | 3/2002 | Bilac et al. | |
| 6,654,219 B1 * | 11/2003 | Romano et al. | 361/78 |
| 6,777,627 B1 * | 8/2004 | Stevenson | 200/50.21 |
| 7,203,040 B2 * | 4/2007 | Shipp et al. | 361/5 |
| 7,292,422 B2 * | 11/2007 | Culligan et al. | 361/93.2 |
| 7,570,465 B2 * | 8/2009 | Beatty et al. | 361/42 |
| 7,646,575 B2 | 1/2010 | Weiher et al. | |
| 7,889,474 B2 | 2/2011 | Weiher et al. | |
| 8,014,115 B2 * | 9/2011 | Vicente et al. | 361/93.1 |
| 8,213,138 B2 * | 7/2012 | Dougherty | 361/42 |
| 8,270,136 B2 * | 9/2012 | Vicente et al. | 361/93.2 |
| 8,351,171 B2 * | 1/2013 | Payack | 361/62 |
| 8,508,891 B2 * | 8/2013 | Carlino et al. | 361/42 |
| 8,564,915 B2 * | 10/2013 | Roscoe et al. | 361/42 |
| 8,649,139 B2 * | 2/2014 | Roscoe et al. | 361/79 |
| 2003/0231440 A1 | 12/2003 | Papallo et al. | |
| 2005/0219775 A1 | 10/2005 | Shipp et al. | |
| 2007/0211400 A1 | 9/2007 | Weiher et al. | |
| 2007/0242402 A1 * | 10/2007 | Papallo et al. | 361/63 |
| 2008/0291595 A1 * | 11/2008 | Raciti et al. | 361/93.7 |
| 2012/0014026 A1 * | 1/2012 | Narel et al. | 361/95 |
| 2012/0320486 A1 * | 12/2012 | Lagree et al. | 361/115 |

OTHER PUBLICATIONS

Chet Davis, P.E., et al., "Practical Solution Guide to Arc Flash Hazards", 2003, Esa, Inc.

Siemens Energy & Automation, Inc., "WL Circuit Breakers Modernize Traditional Arc Flash Protection Techniques", 2004, Alpharetta, GA, USA.

Square D Company, "Arc Flash Protection with Masterpact NW and NT Circuit Breakers", 2003, Cedar Rapids, IA, USA.

International Search Report for PCTUS2007/063690 dated Mar. 21, 2008.

"Application Schemes", Kirk Key Interlock Company, online document available at www.kirkkey.com, Massillon, OH 2006.

* cited by examiner

MANUALLY-CONTROLLED ARC FLASH ENERGY REDUCTION SYSTEM AND METHOD FOR CIRCUIT BREAKER TRIP UNITS

CROSS-REFERENCE TO RELATED APPLICATIONS

Benefit of U.S. Provisional patent application Ser. No. 61/533,843 filed Sep. 13, 2011 is hereby claimed and the disclosure incorporated herein by reference.

BACKGROUND OF THE INVENTION

1. Field of the Invention

The present invention relates to electrical overcurrent protection devices, particularly electronic trip circuit breakers having a manually-controlled arc flash energy reduction system.

2. Description of Related Art

Overcurrent protection devices (OPDs) are used in electrical distribution systems to protect electrical conductors and equipment against the effects of short circuits, ground faults, and/or overloads (hereinafter "faults"). The OPDs in an electrical distribution system are often selectively coordinated so that the nearest OPD upstream to a fault will open and clear the fault before another further upstream OPD opens. Selective coordination of OPDs limits the number of distribution circuits that are de-energized by the operation of an OPD in response to a fault. However, selective coordination of OPDs may also result in added time delays that could allow more energy to be released during a fault than would have been released had the OPDs not been selectively coordinated.

The OPDs in an electrical distribution system can be circuit breakers having programmable electronic controllers for controlling the OPDs' trip settings. The programmable electronic trip controllers are known as electronic trip units and circuit breakers employing electronic trip units are known as electronic trip circuit breakers. Selective coordination among electronic trip circuit breakers is achieved by appropriately adjusting the trip settings of the electronic trip units.

Some electronic trip circuit breakers can be placed into a maintenance mode in which potential arc flash energy downstream of the circuit breaker is reduced. In maintenance mode, the circuit breaker uses trip settings (e.g., an instantaneous trip setting) that cause the circuit breaker to trip quickly, and tripping quickly reduces potential arc flash energy. The maintenance mode can be enabled through the use of a maintenance switch. A problem associated with the use of a maintenance switch is that an operator might fail to operate the maintenance switch prior to performing work downstream of the circuit breaker. For example, the operator might forget to operate the maintenance switch, or simply ignore the maintenance switch. It would be desirable to require that the maintenance mode be enabled before work is performed near energized equipment downstream of an electronic trip circuit breaker that is capable of being placed into the maintenance mode.

BRIEF SUMMARY OF THE INVENTION

The following summary presents a simplified summary in order to provide a basic understanding of some aspects of the devices, systems and methods discussed herein. This summary is not an extensive overview of the devices, systems and methods discussed herein. It is not intended to identify critical elements or to delineate the scope of such devices, systems and methods. Its sole purpose is to present some concepts in a simplified form as a prelude to the more detailed description that is presented later.

In accordance with one aspect of the present invention, provided is a circuit protection system having a normal mode, and a maintenance mode in which potential arc flash energy is reduced. A downstream circuit breaker is mounted within a first enclosure, the first enclosure comprising a first access panel that is moveable to open the first enclosure such that an interior of the first enclosure is accessible. The first enclosure comprises a first key lock that locks the first access panel in a closed position. An upstream circuit breaker is connected to the downstream circuit breaker along an electrical circuit protected by the circuit protection system. The upstream circuit breaker is mounted within a second enclosure comprising a second access panel that is movable to open the second enclosure such that an interior of the second enclosure is accessible. A current sensor senses electrical current in the electrical circuit. An electronic trip unit is in communication with the current sensor for controlling automatic interruptions of the electrical current by the upstream circuit breaker based on a trip setting. A user interface device comprises a primary trapped key. The user interface device is accessible when second enclosure is closed, and allows user selections of the normal mode and the maintenance mode. When the maintenance mode is selected using the user interface device, the electronic trip unit changes the trip setting such that potential arc flash energy is reduced, and the primary trapped key is released and removable from the user interface device. A transfer interlock comprises a secondary trapped key, and a second key lock that is unlocked using the primary trapped key to thereby release the secondary trapped key from the transfer interlock. The first key lock is unlocked using the secondary trapped key to thereby unlock the first access panel.

In accordance with another aspect of the present invention, provided is a circuit protection system, having a normal mode, and a maintenance mode in which potential arc flash energy is reduced. A downstream circuit breaker mounted within a first enclosure, the first enclosure comprising a first access panel that is moveable to open the first enclosure such that an interior of the first enclosure is accessible. The first enclosure comprises a key lock that locks the first access panel in a closed position. An upstream circuit breaker connected to the downstream circuit breaker along an electrical circuit protected by the circuit protection system. The upstream circuit breaker is mounted within a second enclosure comprising a second access panel that is movable to open the second enclosure such that an interior of the second enclosure is accessible. A current sensor senses electrical current in the electrical circuit. An electronic trip unit is in communication with the current sensor for controlling automatic interruptions of the electrical current by the upstream circuit breaker based on a trip setting. A user interface device comprises a primary trapped key. The user interface device is accessible when second enclosure is closed, and allows user selections of the normal mode and the maintenance mode. When the maintenance mode is selected using the user interface device, the electronic trip unit changes the trip setting such that potential arc flash energy is reduced, and the primary trapped key is released and removable from the user interface device. The key lock is unlocked using the primary trapped key to thereby unlock the first access panel.

In accordance with another aspect of the present invention, provided is a circuit protection system, having a normal mode, and a maintenance mode in which potential arc flash energy is reduced. A downstream overcurrent protection device comprises a downstream circuit breaker mounted within a first enclosure, the first enclosure comprising a first access panel that is moveable to open the first enclosure such that an interior of the first enclosure is accessible. The first enclosure comprises a locking mechanism that locks the first access panel in a closed position. An upstream overcurrent protection device comprises an upstream circuit breaker connected to the downstream circuit breaker along an electrical circuit protected by the circuit protection system. The upstream circuit breaker is mounted within a second enclosure comprising a second access panel that is movable to open the second enclosure such that an interior of the second enclosure is accessible. A current sensor senses electrical current in the electrical circuit. An electronic trip unit is in communication with the current sensor for controlling automatic interruptions of the electrical current by the upstream circuit breaker based on a trip setting. A user interface device is accessible when second enclosure is closed, and allows user selections of the normal mode and the maintenance mode. When the maintenance mode is selected using the user interface device, the electronic trip unit changes the trip setting such that potential arc flash energy is reduced. The upstream overcurrent protection device is operatively connected to the downstream overcurrent protection device to send an unlocking signal to the downstream overcurrent protection device when the maintenance mode is currently selected.

In accordance with another aspect of the present invention, provided is a circuit protection system, having a normal mode, and a maintenance mode in which potential arc flash energy is reduced. A downstream overcurrent protection device comprises a downstream circuit breaker mounted within a first enclosure, the first enclosure comprising a first access panel that is moveable to open the first enclosure such that an interior of the first enclosure is accessible. The first enclosure comprises a locking mechanism that locks the first access panel in a closed position. An upstream overcurrent protection device comprises an upstream circuit breaker connected to the downstream circuit breaker along an electrical circuit protected by the circuit protection system. The upstream circuit breaker is mounted within a second enclosure comprising a second access panel that is movable to open the second enclosure such that an interior of the second enclosure is accessible. A current sensor senses electrical current in the electrical circuit. An electronic trip unit is in communication with the current sensor for controlling automatic interruptions of the electrical current by the upstream circuit breaker based on a trip setting. A user interface device is accessible when second enclosure is closed, and allows user selections of the normal mode and the maintenance mode. When the maintenance mode is selected using the user interface device, the electronic trip unit changes the trip setting such that potential arc flash energy is reduced. The circuit protection system is configured to keep the first access panel locked in the closed position based on the normal mode being currently selected, and allow unlocking of the first access panel based on the maintenance mode being currently selected.

DETAILED DESCRIPTION OF THE INVENTION

Figure 1:
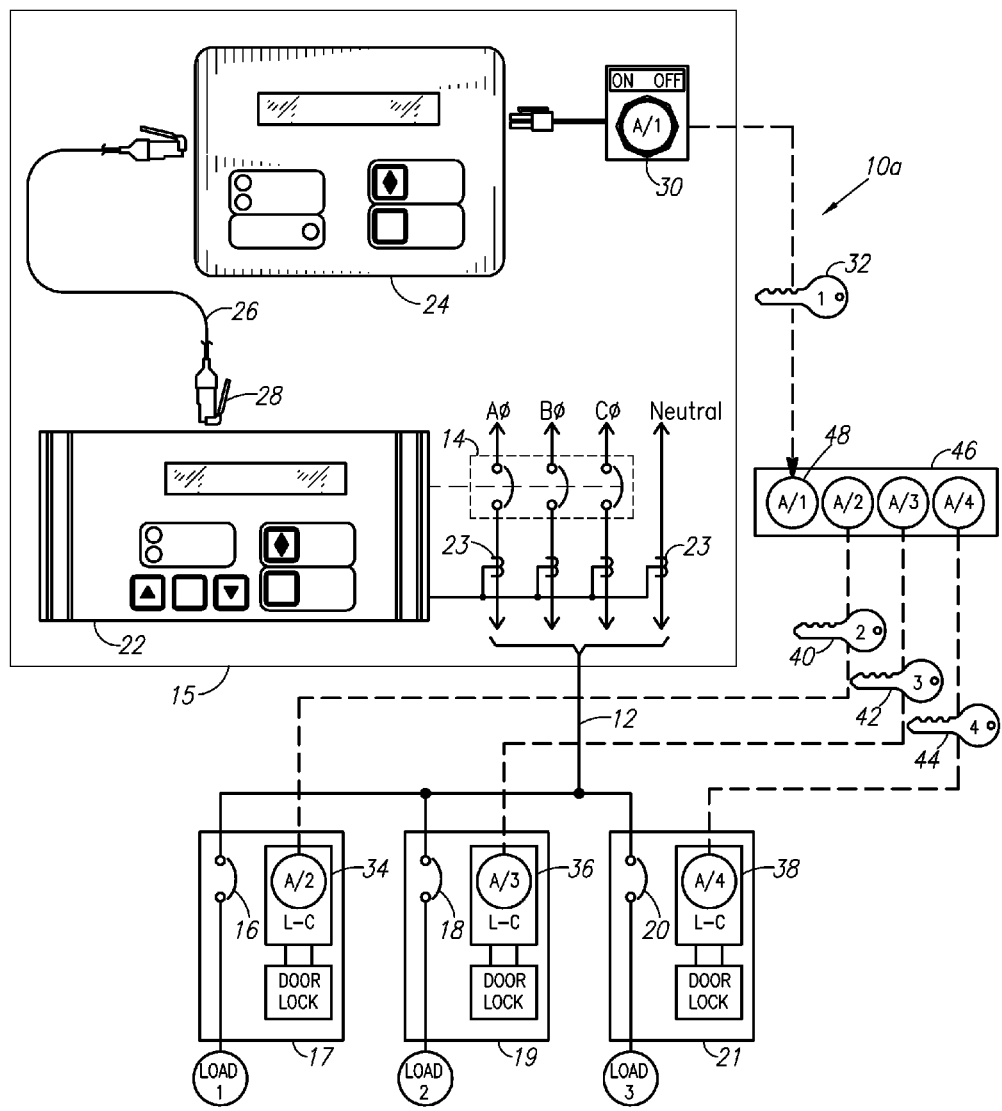
FIG. 1 is a schematic diagram of a circuit protection system.

The present invention relates to electrical overcurrent protection devices, particularly electronic trip circuit breakers having a manually-controlled arc flash energy reduction system. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

An arc flash during a fault could harm nearby persons and/or property. Such harm could be mitigated by reducing the potential arc flash energy of the arc flash. One equation for determining potential arc flash in a cubic box is:

$$E = 1038.7 \times D^{-1.4738} \times t \times (0.0093 \times F^2 - 0.3453 \times F + 5.9675)$$

where E is the energy level in cal/cm$^2$ in a box not larger than 20 inches, D is the distance from an electrode in inches (for distances of 18 inches and greater), t is the arc duration in seconds, and F is available fault current in kA (for the range of 15 to 50 kA). From the above equation, it can be seen that at a given distance, potential arc flash energy can be reduced by shortening the duration of the arc.

Example circuit protection systems are described below in which electrical power is supplied through an upstream circuit breaker to one or more downstream circuit breakers in a power distribution circuit or system. The upstream breaker can be placed into a maintenance mode in which trip settings of the breaker are changed so that the breaker operates more quickly than normal and potential arc flash energy is reduced. The circuit protection system is configured to keep respective enclosures for the downstream circuit breakers locked closed when the upstream breaker is not in the maintenance mode (i.e., while the upstream breaker is in a normal mode). When the potential arc flash energy has been reduced by enabling the maintenance mode, the enclosures can be unlocked or are automatically unlocked by the circuit protection system. Various example devices, systems and methods for keeping downstream circuit breaker enclosures locked closed in the normal mode, while unlocking or permitting unlocking of the enclosures in the maintenance mode, are discussed in detail below.

FIG. 1 provides a schematic diagram of a circuit protection system 10*a*. Power is distributed via an electrical circuit 12 extending from an upstream circuit breaker 14 to one or more downstream circuit breakers 16, 18, 20. The upstream circuit breaker 14 and downstream circuit breakers 16, 18, and 20 are each part of a respective OPD 15, 17, 19, 21. In the figures, the downstream circuit breakers 16, 18, 20 are supply power to loads, such as electric motors. However, it is to be appreciated that the downstream circuit breakers 16, 18, 20 could supply power to other power distribution devices, such as panelboards, motor control centers, etc.

The upstream circuit breaker 14 and, optionally, the downstream circuit breakers 16, 18, 20, have a manually-controlled arc flash energy reduction system. An electronic trip unit 22 is operatively connected to the operating mechanism of the upstream circuit breaker 14. The trip unit 22 is also operatively connected to or in communication with a plurality of current sensors 23, such as current transformers (CTs). The electronic trip unit 22 controls the upstream circuit breaker's operating mechanism based on a plurality of settings (collectively referred to as a "trip setting") and a current level in the circuit that is sensed by the CTs. The trip unit 22 signals the circuit breaker's operating mechanism to open the circuit breaker whenever a fault condition occurs. Thus, the trip unit 22 controls automatic interruptions of electrical current in the circuit 12 by the upstream circuit breaker 14 based on the trip setting.

The electronic trip unit 22 can include, among other settings, the following settings: a long time current pickup setting, a long time delay setting, a short time current pickup setting, a short time delay setting, an instantaneous current pickup setting, a ground fault current pickup setting, a ground fault delay setting, a maintenance mode instantaneous current pickup setting that is normally disabled, and a maintenance mode ground fault current pickup setting that is normally disabled. Input devices on the trip unit 22 allow a user to program setpoint levels for the various settings.

When the arc flash energy reduction system is disabled, the system is in the "normal mode." In normal mode, the instantaneous current pickup setting and/or the ground fault current pickup setting may be enabled or disabled as desired. For example, selective coordination with the downstream circuit breakers 16, 18, 20 may require that the instantaneous current pickup setting be disabled. Further, in normal mode, the maintenance mode instantaneous current pickup setting and the maintenance mode ground fault current pickup setting are disabled. That is, while in normal mode, the electronic trip unit 22 ignores the maintenance mode instantaneous current pickup setting and the maintenance mode ground fault current pickup setting. When the arc flash energy reduction system is enabled, the system is in the "maintenance mode." In maintenance mode, the maintenance mode instantaneous current pickup setting and the maintenance mode ground fault current pickup setting are enabled, and, therefore, not ignored by the electronic trip unit. In an embodiment, when the maintenance mode instantaneous current pickup setting and the maintenance mode ground fault current pickup setting are enabled, they operate in addition to the instantaneous current pickup setting and the ground fault current pickup setting, which remain enabled if enabled in normal mode. In another embodiment, when the maintenance mode instantaneous current pickup setting and the maintenance mode ground fault current pickup setting are enabled, they operate as an alternative to the instantaneous current pickup setting and the ground fault current pickup setting, which are disabled in maintenance mode. In an embodiment, when the system is in the maintenance mode, at least one of the short time current pickup setting and the instantaneous current pickup setting are disabled and the maintenance mode instantaneous current pickup setting is enabled.

The maintenance mode instantaneous current pickup setting provides a faster tripping of the circuit breaker 14 than the short time current pickup setting and can under certain circumstances provide a faster tripping than the instantaneous current pickup setting. Similarly, the maintenance mode ground fault current pickup setting provides a faster tripping of the circuit breaker 14 than the ground fault current pickup setting. Accordingly, when in maintenance mode, the circuit breaker 14 can clear a fault more quickly than in normal mode. In maintenance mode, the potential arc flash energy due to a fault is reduced, and maintenance can be performed on energized equipment downstream from the circuit breaker 14, such as the downstream circuit breakers 16, 18, 20, while exposed to the reduced potential arc flash energy.

When in maintenance mode, the circuit breaker 14 behaves like a zone selective interlocking (ZSI) circuit breaker that fails to receive a restraint signal; it responds quickly to a fault. By responding quickly to a fault, incident arc flash energy is reduced. However, the maintenance mode may not provide selective coordination of OPDs. In normal mode, selective coordination in the electrical distribution system is preserved.

In certain embodiments, the electronic trip unit 22 is connected to a display 24. The connection between the trip unit 22 and display 24 could be through a hardwired or wireless connection and provides a communications transmission path between the trip unit 22 and display 24. FIG. 1 shows the electronic trip unit 22 and display 24 connected by a cable 26. The cable can include a plug 28 at either end for plugging into communication port jacks on the trip unit 22 and display 24. The plugs 28 provide a readily removable connection between the trip unit 22 and display 24.

The display 24 communicates with the trip unit 22. The display 24 receives data from the trip unit and displays messages based on the data. For example, the display 24 could display various circuit breaker settings, present current level in the circuit 12, historical trip data, and the like.

The display 24 can include a battery system for powering the display 24. Alternatively, the display 24 can be powered through its interconnection with the trip unit 22. For example, both of the trip unit 22 and the display 24 can be powered by the CTs 23. The display 24 can also be powered from a power source local to the display 24.

A user interface device is connected to the display 24 or directly to the trip unit 22. The user interface device can include a switch, such as a pushbutton or selector switch. However, in FIG. 1, the user interface device includes a key switch 30 that is operable using a primary trapped key 32 that is inserted into a corresponding key hole in the key switch 30. The key switch 30 functions as a maintenance mode switch for switching between the maintenance mode when in the ON position (i.e., maintenance mode position) and the normal mode when in the OFF position (i.e., normal mode position). The key switch 30 can be a two-position selector switch having the ON position and the OFF position, for manually enabling and disabling the arc flash energy reduction system. The display 24 or trip unit 22 monitors the position or state of the key switch 30. The display 24 can communicate the state of the key switch 30 to the trip unit 22.

The key switch 30 would typically be mounted near the display 24, such as on the door of an enclosure for the circuit breaker 14. If the key switch 30 is connected directly to the display 24, and not the trip unit 22, a single cable 26, such as a ribbon cable, can be run between the trip unit 22 and display/key switch location. Furthermore, the cable 26 can be readily disconnected from the trip unit 22 by removal of either plug 28, which facilitates removal of the circuit breaker 14 and/or the trip unit 22 for maintenance, replacement, etc.

The display 24 includes an electronic controller, for example, a microprocessor or microcontroller, and is configured to communicate with the trip unit 22, which also includes an electronic controller. The display 24 further includes indicating lights, for example, LED indicating lights, and an alphanumeric/graphical display system, for example, a liquid crystal display (LCD). Through the indicating lights and the alphanumeric/graphical display system, the display 24 can provide information to a user regarding various circuit breaker settings, present current level in the circuit, historical trip data, information about the display 24 itself, and/or the position of the key switch 30. For example, indicating lights can be provided to indicate that the display 24 is working properly, the existence of an overcurrent condition, or that the key switch 30 is in the ON or OFF position.

The display 24 can be configured to display the following information: CT rating, long time current pickup setting, long time delay setting, short time current pickup setting, short time delay setting, short time I$^2$T, instantaneous current pickup setting, ground fault current pickup setting, ground fault delay setting, ground fault I$^2$T, phase unbalance current pickup setting, phase unbalance delay setting, maintenance mode ground fault current pickup setting, maintenance mode instantaneous pickup setting, last trip data, ground fault >2 times CT rating, phase unbalance percentage, historical trip data, low current condition, overload condition, phase A, B, and C currents, ground fault current, and line-to-line and line-to-neutral voltages. Buttons can be provided on the display 24 for selecting the information to be displayed. For example, a user can sequentially toggle among the information that can be displayed by repeatedly pressing a button. In an embodiment, various settings of the trip unit 22, for example the trip setting, can be set at the display 24 and not merely displayed at the display 24. In a further embodiment, the various settings of the trip unit 22 cannot be changed at the display 24, to prevent unauthorized changes.

A user places the circuit protection system in maintenance mode by moving the key switch 30 to the ON position. When the key switch 30 is moved to the ON position, the display 24 sends data to the trip unit 22 to inform the trip unit of the position of the key switch (or the trip unit 22 monitors the state of the key switch 30 directly). In an embodiment, the trip unit 22 responds to the movement of the key switch 30 to the ON position by enabling the maintenance mode instantaneous current pickup setting and the maintenance mode ground fault current pickup setting for as long as the key switch 30 is in the ON position. In a further embodiment, the trip unit 22 responds by also disabling the ground fault current pickup setting and disabling at least one of the short time current pickup setting and the instantaneous current pickup setting. In a still further embodiment, the trip unit 22 responds by adjusting the instantaneous current pickup setting and the ground fault current pickup setting based on, for example, the maintenance mode instantaneous current pickup setting and the maintenance mode ground fault current pickup setting. For example, in the maintenance mode, the instantaneous current pickup setting can be replaced with the maintenance mode current pickup setting and the ground fault current pickup setting can be replaced with the maintenance mode ground fault current pickup setting. In a still further embodiment, the trip unit responds to the movement of the key switch 30 to the ON position by adjusting the ground fault delay setting to a lower setting, such as a minimal delay setting.

In an embodiment, the maintenance mode ground fault current pickup setting ranges from of 20% to 200% of the CT rating, with a maximum of 1200 amps, and is adjustable in 10 amp steps. However, other ranges and/or settings are also possible. In an embodiment, the maintenance mode ground fault current pickup setting can be turned off or disabled, so that the electronic trip unit 22 uses no maintenance mode ground fault pickup setting when the key switch 30 is in the ON position. In an embodiment, the maintenance mode instantaneous pickup setting ranges from 150% to 1200% of the long time current pickup setting, and is adjustable in 100 amp steps. However, other ranges and/or settings are also possible. By appropriately selecting and setting the maintenance mode ground fault current pickup setting and maintenance mode instantaneous pickup setting, arc flash potential downstream of the circuit breaker 14 can be reduced, due to a reduced breaker clearing time.

In an embodiment, the trip unit 22 does not include the maintenance mode ground fault current pickup setting and the maintenance mode instantaneous current pickup setting, and the display 24 and/or trip unit 22 automatically adjusts the ground fault current pickup setting and the instantaneous current pickup setting whenever the key switch 30 is moved to the ON position.

In an embodiment, normal mode and maintenance mode settings are stored in a memory portion of the display 24. As the key switch 30 is moved between the ON and OFF positions, the display 24 communicates the appropriate settings to the trip unit 22, overwriting a prior setting stored within the trip unit 22. In this embodiment, the display 24 acts as a remote programmer for the trip unit 22. In an embodiment, the display 24 downloads and saves the trip unit's 22 normal mode settings in response to the key switch 30 being moved to the ON position. The display 24 then communicates the position of the key switch 30 to the trip unit 22 and/or overwrites the trip unit's 22 normal mode settings with maintenance mode settings. When the key switch 30 is moved to the OFF position, the display 24 communicates this to the trip unit 22 and/or overwrites the maintenance mode settings with the previously downloaded and saved normal mode settings.

When the key switch 30 is in the OFF or normal mode position, the primary trapped key 32 is trapped in the key switch. Moving the key switch 30 to the ON or normal mode position releases the primary trapped key 32, so that it is removable from the key switch 30. When the primary trapped key 32 is removed from the key switch 30, the key switch 30 is locked in the ON or maintenance mode position.

The downstream circuit breakers 16, 18, 20 are mounted within respective enclosures. The enclosures have access panels (e.g., doors) for opening the enclosures so that their interiors are accessible, allowing maintenance to be performed on the circuit breakers 16, 18, 20, their trip units, etc. The enclosures have locking mechanisms for locking the doors in a closed position. The locking mechanisms can include key locks 34, 36, 38 or interlocks that lock the door closed. The doors can be unlocked by use of an appropriate key 40, 42, 44 that corresponds to the key lock 34, 36, 38. The key locks 34, 36, 38 can be keyed differently, or one or more of the key locks can be keyed the same.

In FIG. 1, the keys 40, 42, 44 for operating the key locks 34, 36, 38 of the downstream circuit breaker enclosures are typically trapped in a transfer interlock 46. Thus, the keys 40, 42, 44 form a plurality of secondary trapped keys. The transfer interlock 46 includes a key lock 48 that corresponds to the primary trapped key 32. The key lock 48 of the transfer interlock 46 can be operated using the primary trapped key 32 to thereby release the secondary trapped keys 40, 42, 44.

When the key lock 48 is operated to release the secondary trapped keys 40, 42, 44 from the transfer interlock 46, the primary trapped key 32 becomes trapped in the key lock 48 of the transfer interlock. The transfer interlock 46 is configured to keep the primary trapped key 32 trapped while the secondary trapped keys 40, 42, 44 are removed. The downstream circuit breaker enclosures can be opened using the secondary trapped keys 40, 42, 44 while the primary trapped key 32 is trapped in the transfer interlock 46. The secondary trapped keys 40, 42, 44 remain trapped in the key locks 34, 36, 38 of the downstream circuit breaker enclosures while the enclosures are unlocked. Accordingly, the primary trapped key 32 cannot be released from the transfer interlock 46 while the downstream circuit breaker enclosures are unlocked. Since the key switch 30 must be in the ON or maintenance mode position to release the primary trapped key 32 from the key switch 30, the downstream circuit breaker enclosures can only be properly unlocked when the circuit protection system is in the maintenance mode.

Figure 2:
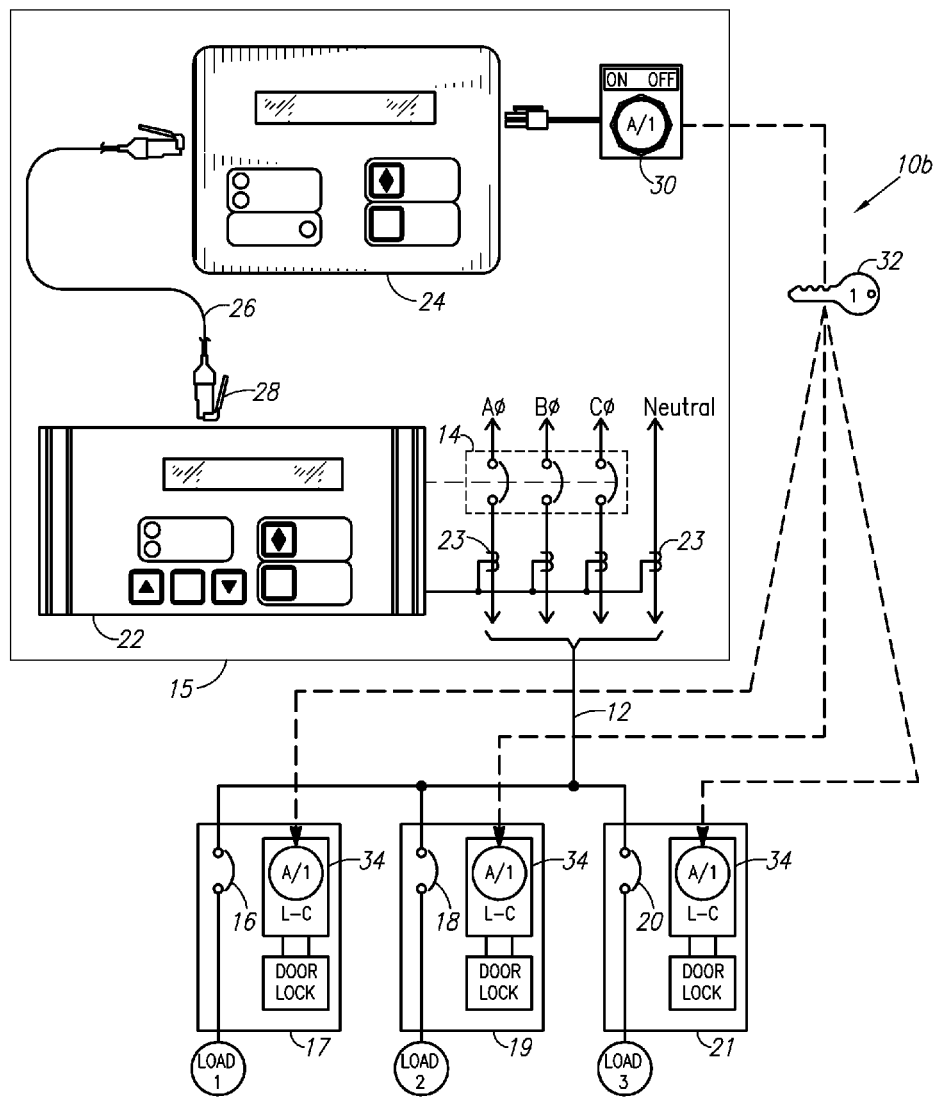
FIG. 2 is a schematic diagram of a circuit protection system.

FIG. 2 shows a circuit protection system 10b that lacks the transfer interlock shown in FIG. 1. In FIG. 2, the primary trapped key 32 is itself used to unlock the key locks 34 of the downstream circuit breaker enclosures 16, 18, 20. If desired, the circuit protection system can have a single primary trapped key 32 without duplicate copies to ensure that the key switch 30 must be in the maintenance mode before the downstream circuit breaker enclosures 16, 18, 20 are unlocked. Alternatively, copies of the primary trapped key 32 can be maintained, such as by authorized personnel for example.

Figure 3:
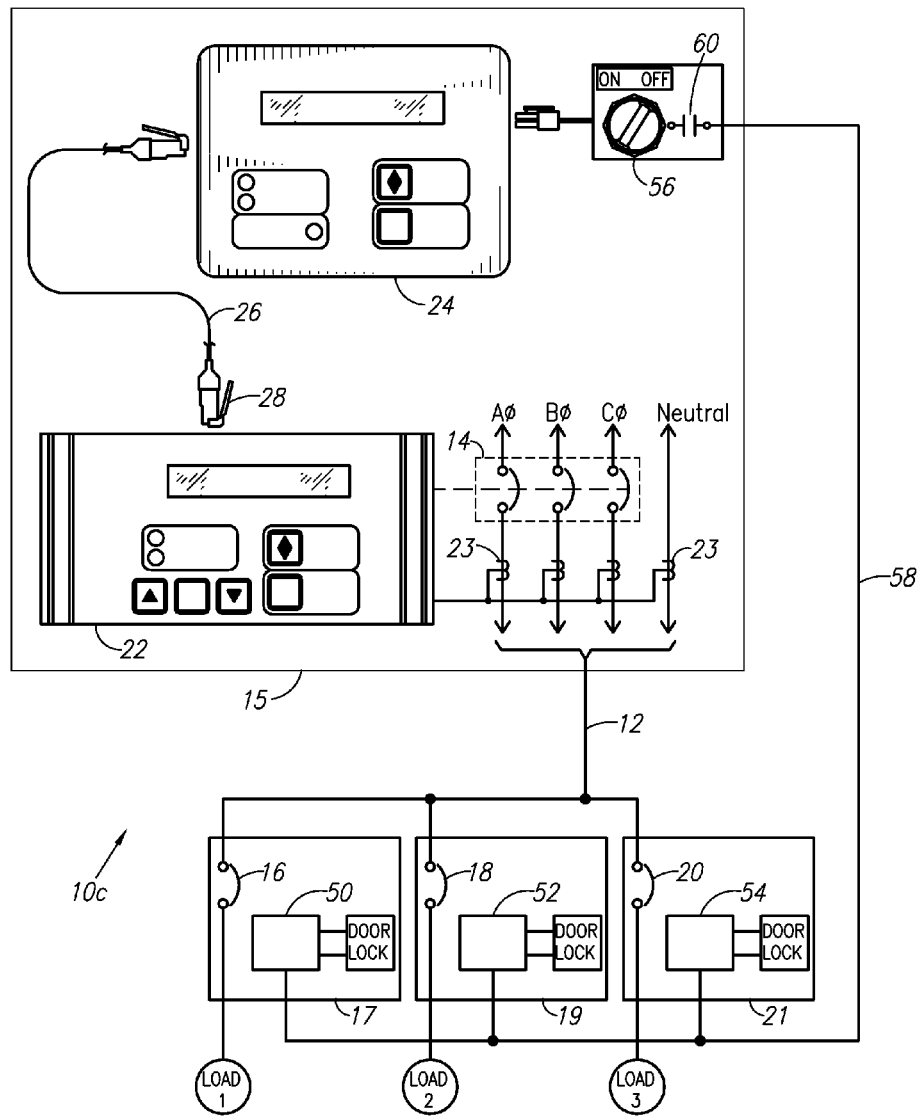
FIG. 3 is a schematic diagram of a circuit protection system.

In the circuit protection system 10c shown in FIG. 3, the locking mechanisms of the downstream circuit breakers have electrically-operated locks 50, 52, 54 rather than key locks. An example electrically-operated lock is a solenoid lock. The electrically-operated locks 50, 52, 54 can be biased (e.g., spring biased) in the locked position such that applying power to the locks causes them to actuate and unlock the circuit breaker enclosure. Alternatively, the locks can be biased in the unlocked position, locking the circuit breaker enclosure when power is applied.

The user interface device 56 can be a conventional toggle switch, rather than a key switch, if trapped-key interlocking is not used. The upstream OPD 15 sends an unlocking signal 58 or signals to the downstream OPDs 17, 19, 21 when the maintenance mode is currently selected with the user interface device 56 in the maintenance mode position. The downstream OPDs 17, 19, 21 respond to the unlocking signal 58 or signals by permitting their enclosures to be unlocked. For example, the downstream OPDs 17, 19, 21 can automatically unlock their enclosures by actuating their locking mechanism upon receiving the unlocking signal(s) 58. In an embodiment, the upstream OPD 15 sends locking signals to the downstream 17, 19, 21 OPDs when the normal mode is currently selected and the user interface device 56 is in the normal mode position.

The unlocking signal(s) 58 can be sent wirelessly or via wired connections between the upstream 15 and downstream 17, 19, 21 OPDs. In wireless embodiments, the upstream OPD 15 can include a transmitter, such as a Bluetooth transmitter, that radiates a signal when the maintenance mode is currently selected. The radiated signal can transmit information to the downstream OPDs 17, 19, 21, which have receivers for receiving the signal. The transmitted information can include the currently selected mode (maintenance and/or normal), an unlocking command, an address or code associated with the intended recipient of the signal, and the like. The address or code can identify one or more downstream OPDs 17, 19, 21 to be unlocked, and the identified downstream OPDs can respond to the unlocking signal by energizing or de-energizing the electrically-operated lock 50, 52, 54, thereby automatically unlocking the enclosure.

In certain embodiments, the electrically-operated lock 50, 52, 54 is energized or de-energized directly by the unlocking signal 58. For example, the user interface device 56 can include auxiliary contacts 60 through which power is supplied to the electrically-operated lock 50, 52, 54. When the maintenance mode is currently selected, the auxiliary contacts 60 are either open or closed such that the electrically-operated locks 50, 52, 54 unlock the enclosures. If the electrically-operated locks 50, 52, 54 are biased in the locked position, moving the user interface device 56 to the maintenance mode (e.g., ON) position can close the auxiliary contacts 60, so that the electrically-operated locks are energized to unlock the enclosures. If the electrically-operated locks 50, 52, 54 are biased in the unlocked position and normally energized to lock the enclosures, moving the user interface device 56 to the maintenance mode (e.g., ON) position can open the auxiliary contacts 60, so that the electrically-operated locks 50, 52, 54 are de-energized. Thus, the unlocking signal 58 can energize or de-energize the electrically-operated locks 50, 52, 54 and can include a voltage level suitable for energizing the locks or the lack of such a suitable voltage level.

The circuit protection system 10c can be configured to selectively send override unlocking signals to the downstream OPDs 17, 19, 21 when the normal mode is currently selected. For example, overrides (e.g., override switches) can be built into the circuit protection system 10c to allow the electrically-operated locks 50, 52, 54 to be energized when the user interface device 56 is in the normal mode (e.g., OFF) position. A password protected override can be built into the trip unit 22 so that only authorized personnel can override the system and open downstream OPDs 17, 19, 21 when the user interface device 56 at the upstream OPD 15 is OFF.

Rather than employing key interlocking or electrical interlocking schemes, the upstream and downstream OPDs can be mechanically interlocked, such as by rods, levers, links, Bowden cables and the like. Operation of the user interface device to select the maintenance mode will mechanically unlock the locking mechanism on a downstream OPD 17, 19, 21. Conversely, selecting the normal mode will mechanically lock the locking mechanism on the downstream OPD 17, 19, 21.

Figure 4:
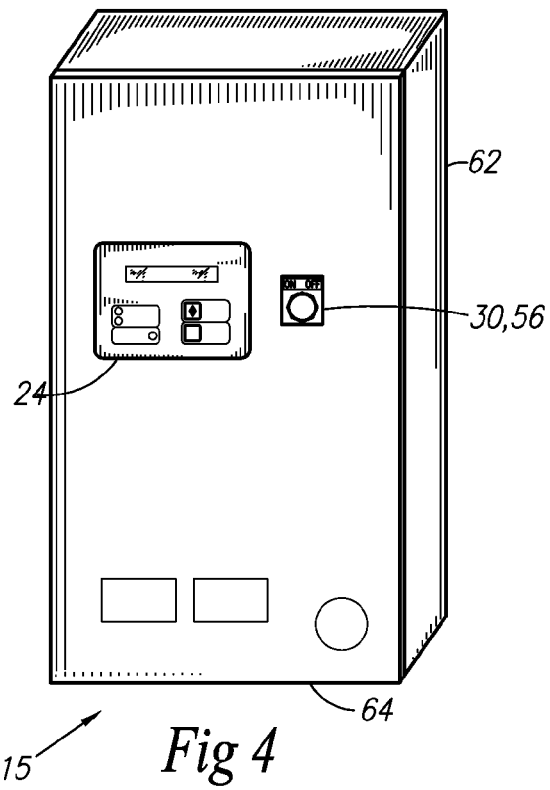
FIG. 4 is an exterior perspective view of an enclosure for a circuit breaker.
Figure 5:
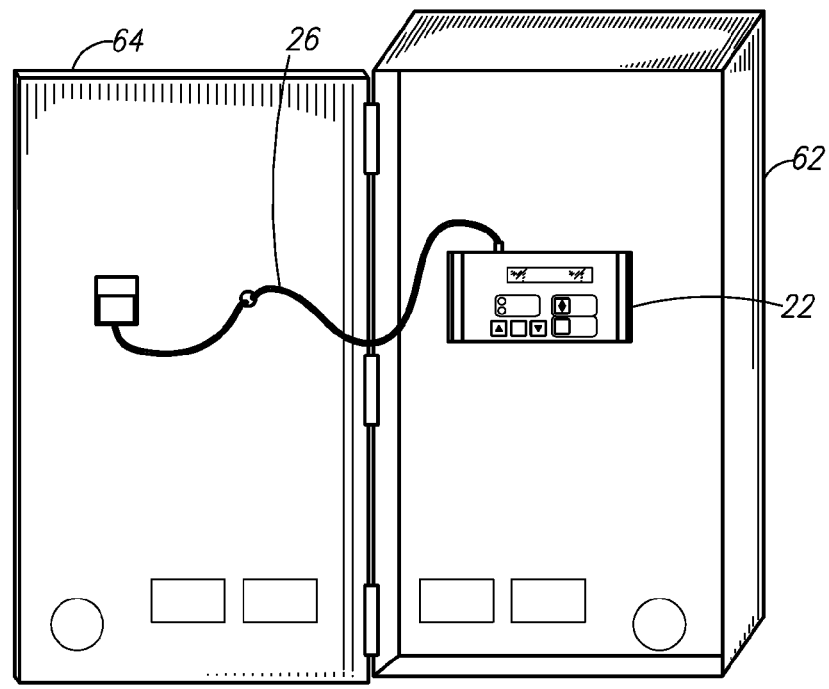
FIG. 5 is an interior perspective view of an enclosure for a circuit breaker.

FIGS. 4 and 5 show an example mounting configuration for the display 24 and user interface device 30, 56 at the upstream OPD. The display 24 and user interface device 30, 56 are mounted to a circuit breaker enclosure 62. More specifically, they are mounted to an access panel, such as a door 64, for the circuit breaker enclosure 62. In FIG. 4, the door 64 is closed, and the display 24 and user interface device 30, 56 are accessible while the door 64 is closed. A maintenance technician can operate the user interface device 30, 56 and view information about the circuit breaker on the display 24 without opening the door 64 and possibly exposing himself to electrically energized parts. In FIG. 5, the door 64 is open and the interior of the enclosure 62 is accessible, exposing the trip unit 22. As discussed above, a single cable 26 can connect the trip unit 22 and the display 24.

Figure 6:
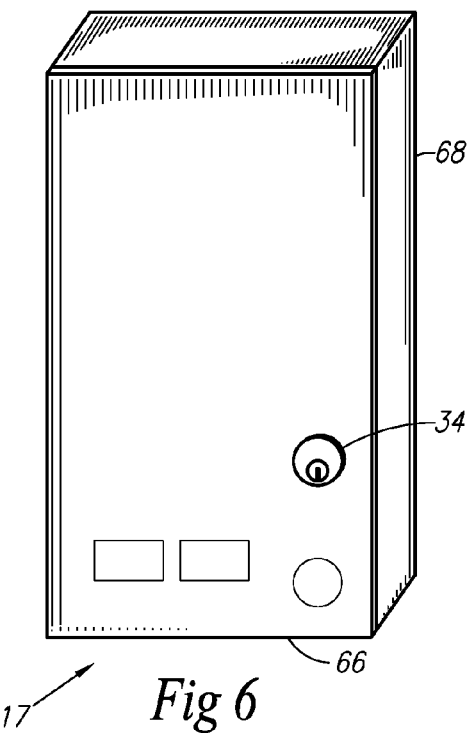
FIG. 6 is an exterior perspective view of an enclosure for a circuit breaker.
Figure 7:
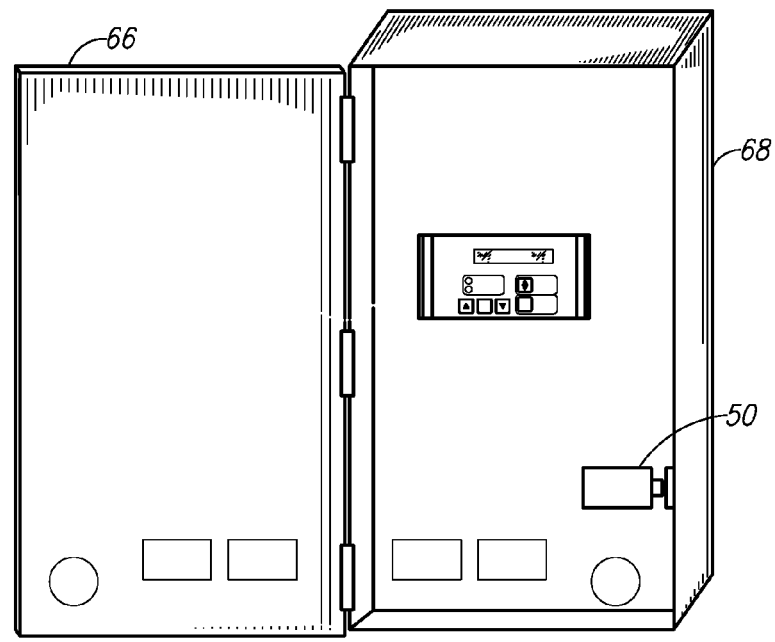
FIG. 7 is an interior perspective view of an enclosure for a circuit breaker.

FIG. 6 shows an example downstream OPD 17 having a key lock 34 as discussed above. The key lock 34 is mounted to an access panel, such as a door 66 of a circuit breaker enclosure 68, and locks the door in the closed position. FIG. 7 shows an example downstream OPD 17 having an electrically-operated lock 50 for locking the door 66 in the closed position.

The arc flash energy reduction system discussed above is implemented at the upstream OPD 15. It is to be appreciated that similar arc flash energy reduction systems can be implement at the downstream OPDs 17, 19, 21 for reducing potential arc flash at further downstream locations along a power distribution system.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A circuit protection system, having a normal mode, and a maintenance mode in which potential arc flash energy is reduced, comprising:
   a downstream circuit breaker mounted within a first enclosure, the first enclosure comprising a first access panel that is moveable to open the first enclosure such that an interior of the first enclosure is accessible, wherein the first enclosure comprises a first key lock that locks the first access panel in a closed position;
   an upstream circuit breaker connected to the downstream circuit breaker along an electrical circuit protected by the circuit protection system, wherein the upstream circuit breaker is mounted within a second enclosure comprising a second access panel that is movable to open the second enclosure such that an interior of the second enclosure is accessible;
   a current sensor for sensing electrical current in the electrical circuit;
   an electronic trip unit in communication with the current sensor for controlling automatic interruptions of the electrical current by the upstream circuit breaker based on a trip setting;
   a user interface device comprising a primary trapped key, wherein:
      the user interface device is accessible when second enclosure is closed, and allows user selections of the normal mode and the maintenance mode, and
      when the maintenance mode is selected using the user interface device, the electronic trip unit changes the trip setting such that potential arc flash energy is reduced, and the primary trapped key is released and removable from the user interface device;
   a transfer interlock comprising a secondary trapped key, and a second key lock that is unlocked using the primary trapped key to thereby release the secondary trapped key from the transfer interlock, and
   wherein the first key lock is unlocked using the secondary trapped key to thereby unlock the first access panel.

2. The circuit protection system of claim 1, wherein the user interface device comprises a key switch that is movable between a normal mode position and a maintenance mode position using the primary trapped key, and the primary trapped key is trapped within the key switch when the key switch is in the normal mode position.

3. The circuit protection system of claim 2, wherein the second access panel is a door, and the key switch is mounted to the door.

4. The circuit protection system of claim 1, wherein the transfer interlock comprises a plurality secondary trapped keys for unlocking a plurality of downstream circuit breaker enclosures when the maintenance mode is currently selected, and the plurality of secondary trapped keys are released from the transfer interlock when the second key lock is unlocked using the primary trapped key.

5. The circuit protection system of claim 1, wherein the primary trapped key is trapped within the transfer interlock when the second key lock is unlocked and the secondary trapped key is released.

6. The circuit protection system of claim 1, wherein the secondary trapped key is trapped within the first key lock when the first access panel is unlocked.

7. A circuit protection system, having a normal mode, and a maintenance mode in which potential arc flash energy is reduced, comprising:
   a downstream circuit breaker mounted within a first enclosure, the first enclosure comprising a first access panel that is moveable to open the first enclosure such that an interior of the first enclosure is accessible, wherein the first enclosure comprises a key lock that locks the first access panel in a closed position;
   an upstream circuit breaker connected to the downstream circuit breaker along an electrical circuit protected by the circuit protection system, wherein the upstream circuit breaker is mounted within a second enclosure comprising a second access panel that is movable to open the second enclosure such that an interior of the second enclosure is accessible;
   a current sensor for sensing electrical current in the electrical circuit;
   an electronic trip unit in communication with the current sensor for controlling automatic interruptions of the electrical current by the upstream circuit breaker based on a trip setting;
   a user interface device comprising a primary trapped key, wherein:
      the user interface device is accessible when second enclosure is closed, and allows user selections of the normal mode and the maintenance mode, and
      when the maintenance mode is selected using the user interface device, the electronic trip unit changes the trip setting such that potential arc flash energy is reduced, and the primary trapped key is released and removable from the user interface device; and
   wherein the key lock is unlocked using the primary trapped key to thereby unlock the first access panel.

8. The circuit protection system of claim 7, wherein the user interface device comprises a key switch that is movable between a normal mode position and a maintenance mode position using the primary trapped key, and the primary trapped key is trapped within the key switch when the key switch is in the normal mode position.

9. The circuit protection system of claim 8, wherein the second access panel is a door, and the key switch is mounted to the door.

10. The circuit protection system of claim 7, wherein the circuit protection system comprises a plurality of downstream circuit breakers configured to be unlocked using the primary trapped key.

11. The circuit protection system of claim 7, wherein the primary trapped key is trapped within the key lock when the first access panel is unlocked.

12. A circuit protection system, having a normal mode, and a maintenance mode in which potential arc flash energy is reduced, comprising:
   a downstream overcurrent protection device comprising a downstream circuit breaker mounted within a first enclosure, the first enclosure comprising a first access panel that is moveable to open the first enclosure such that an interior of the first enclosure is accessible, wherein the first enclosure comprises a locking mechanism that locks the first access panel in a closed position; and an upstream overcurrent protection device comprising:
an upstream circuit breaker connected to the downstream circuit breaker along an electrical circuit protected by the circuit protection system, wherein the upstream circuit breaker is mounted within a second enclosure comprising a second access panel that is movable to open the second enclosure such that an interior of the second enclosure is accessible;
a current sensor for sensing electrical current in the electrical circuit;
an electronic trip unit in communication with the current sensor for controlling automatic interruptions of the electrical current by the upstream circuit breaker based on a trip setting;
a user interface device that is accessible when second enclosure is closed, wherein:
the user interface device allows user selections of the normal mode and the maintenance mode,
when the maintenance mode is selected using the user interface device, the electronic trip unit changes the trip setting such that potential arc flash energy is reduced, and
wherein the upstream overcurrent protection device is configured to send an unlocking signal to the downstream overcurrent protection device when the maintenance mode is currently selected.

13. The circuit protection system of claim 12, wherein when the downstream overcurrent protection device receives the unlocking signal, the locking mechanism automatically unlocks the first access panel.

14. The circuit protection system of claim 13, wherein the second access panel is a door, and the user interface device is a selector switch mounted to the door, and the unlocking signal is provided through auxiliary contacts of the selector switch.

15. The circuit protection system of claim 12, wherein the locking mechanism comprises an electrically-operated lock.

16. The circuit protection system of claim 15, wherein the electrically-operated lock comprises a solenoid that unlocks the first access panel when energized, and wherein the solenoid is energized by the unlocking signal.

17. The circuit protection system of claim 16, wherein the unlocking signal is provided through a closure of auxiliary contacts of the user interface device.

18. The circuit protection system of claim 12, wherein the upstream overcurrent protection device sends unlocking signals to a plurality of additional downstream overcurrent protection devices when the maintenance mode is currently selected.

19. The circuit protection system of claim 12, wherein the circuit protection system is configured to selectively send an override unlocking signal to the downstream overcurrent protection device when the normal mode is currently selected.

20. The circuit protection system of claim 12, wherein the unlocking signal is sent wirelessly to the downstream overcurrent protection device.

21. A circuit protection system, having a normal mode, and a maintenance mode in which potential arc flash energy is reduced, comprising:
a downstream overcurrent protection device comprising a downstream circuit breaker mounted within a first enclosure, the first enclosure comprising a first access panel that is moveable to open the first enclosure such that an interior of the first enclosure is accessible, wherein the first enclosure comprises a locking mechanism that locks the first access panel in a closed position; and an upstream overcurrent protection device comprising:
an upstream circuit breaker connected to the downstream circuit breaker along an electrical circuit protected by the circuit protection system, wherein the upstream circuit breaker is mounted within a second enclosure comprising a second access panel that is movable to open the second enclosure such that an interior of the second enclosure is accessible;
a current sensor for sensing electrical current in the electrical circuit;
an electronic trip unit in communication with the current sensor for controlling automatic interruptions of the electrical current by the upstream circuit breaker based on a trip setting;
a user interface device that is accessible when second enclosure is closed, wherein:
the user interface device allows user selections of the normal mode and the maintenance mode, and
when the maintenance mode is selected using the user interface device, the electronic trip unit changes the trip setting such that potential arc flash energy is reduced; and
wherein the circuit protection system is configured to keep the first access panel locked in the closed position based on the normal mode being currently selected, and allow unlocking of the first access panel based on the maintenance mode being currently selected.

22. The circuit protection system of claim 21, wherein the user interface device comprises a key switch that is movable between a normal mode position and a maintenance mode position using a primary trapped key, and the circuit protection system comprises a transfer interlock comprising a secondary trapped key that is releasable from the transfer interlock by operation of a key lock using the primary trapped key, wherein the secondary trapped key is configured to unlock the first access panel.

23. The circuit protection system of claim 21, wherein the first enclosure comprises a key lock, and the user interface device comprises a key switch that is movable between a normal mode position and a maintenance mode position using a primary trapped key, and wherein the key lock is unlocked using the primary trapped key to thereby unlock the first access panel.

24. The circuit protection system of claim 21, wherein the locking mechanism comprises an electrically-operated lock.

25. The circuit protection system of claim 24, wherein operations of the electrically-operated lock are controlled based on an unlocking signal sent from the upstream overcurrent protection device to the downstream overcurrent protection device.

26. The circuit protection system of claim 25, wherein the electrically-operated lock is energized by the unlocking signal.

27. The circuit protection system of claim 25, wherein the circuit protection system is configured to selectively send an override unlocking signal to the downstream overcurrent protection device when the normal mode is currently selected.

28. The circuit protection system of claim 21, wherein the first access panel is automatically unlocked by the circuit protection system based on the maintenance mode being currently selected.

* * * * *